Sept. 6, 1966    R. D. OBADAL ETAL    3,270,462
CLOSURE MOUNTING

Filed Oct. 2, 1964    2 Sheets-Sheet 1

INVENTORS
R.D. OBADAL & J.G. JOHNSON

Sept. 6, 1966  R. D. OBADAL ETAL  3,270,462
CLOSURE MOUNTING
Filed Oct. 2, 1964  2 Sheets-Sheet 2
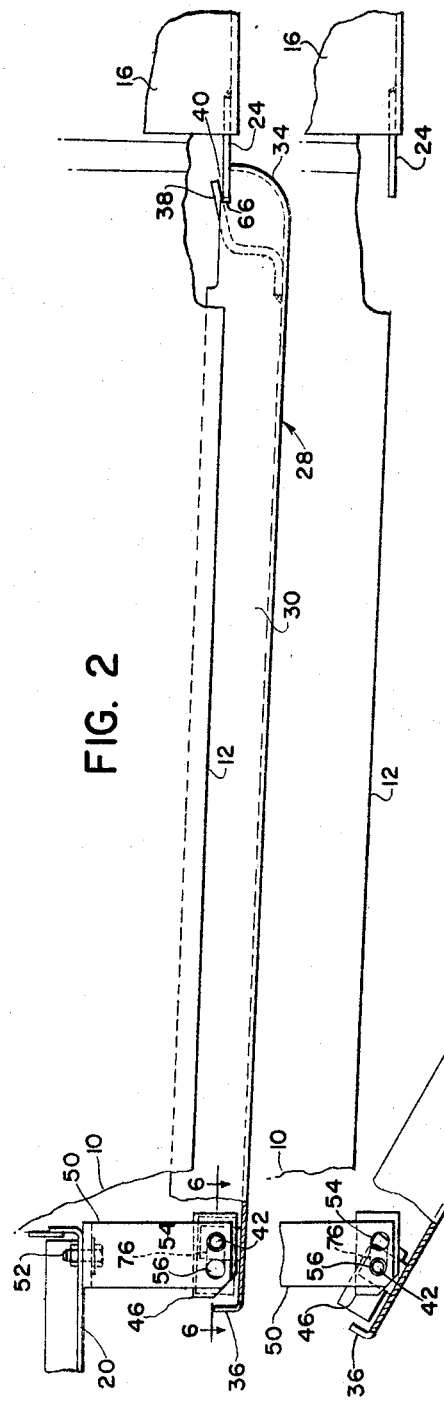
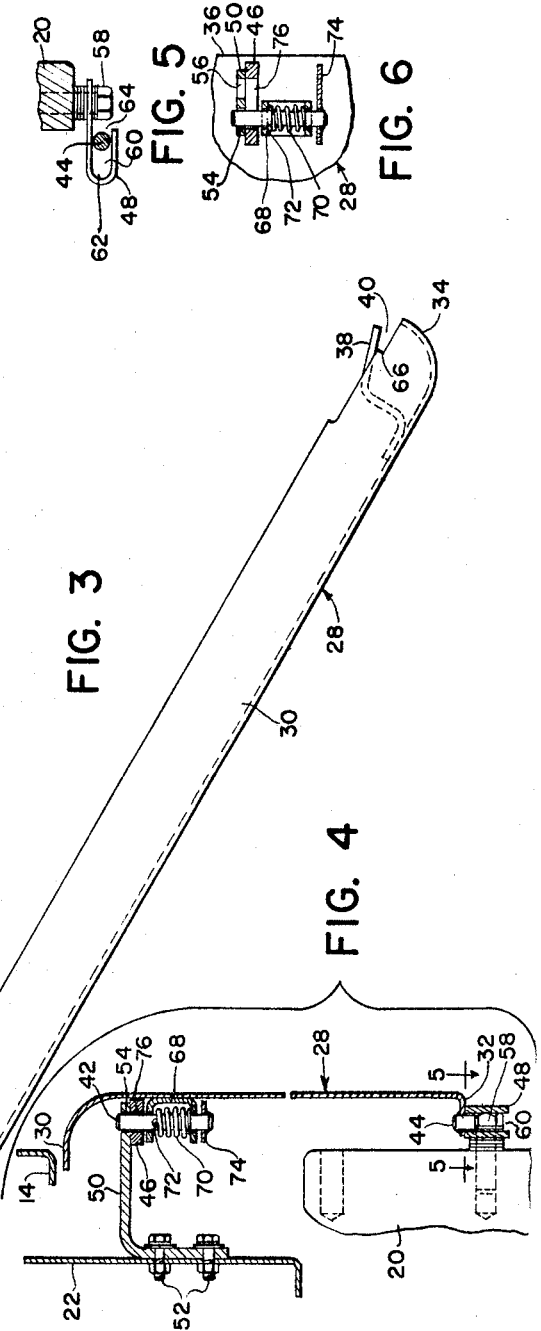
INVENTORS
R.D. OBADAL & J.G. JOHNSON

United States Patent Office 3,270,462
Patented Sept. 6, 1966

3,270,462
CLOSURE MOUNTING
Richard D. Obadal, Cedar Falls, and John G. Johnson, Waterloo, Iowa, assignors to Deere & Company, Moline, Ill., a corporation of Delaware
Filed Oct. 2, 1964, Ser. No. 401,162
1 Claim. (Cl. 49—257)

This invention relates to a closure mouting and more particularly to improvements in the support of a closure panel or the like for swinging movement and for selective removal when desired.

The invention finds especial, but not exclusive, utility in the mounting of a side sheet or panel on the engine hood structure of a vehicle such as an agricultural or industrial tractor.

In an environment of this type, it is desired that the side panels be at least swingable for access to the engine, for example, for minor adjustments. In other instances, where major problems arise, it is desired that the panel or side sheet be removable.

Accordingly, the principal object of the invention resides in an improved closure mounting of the character indicated. Specifically, the invention has for an object a closure mounting arrangement in which the closure is shiftable fore and aft, for example, between front and rear positions, shifting to the rear being incident to release of the panel for outward swinging. It is a further feature of the invention that the panel, when swung outwardly to at least a partially opened position, may be easily removed. Further objects reside in improvements in the retaining and shifting hinge means, together with releasable means for securing the panel in place and yet providing for easy swinging and removal.

The foregoing and other important objects and desirable features inherent in and encompassed by the invention will become apparent as a preferred embodiment thereof is disclosed, by way of example, in the ensuing description and accompanying sheets of drawings, the figures of which are described below.

FIG. 2 is a fragmentary plan view, with portions broken away and other portions shown in section, illustrating the closure in its closed position.

FIG. 3 is a similar view, but showing the closure in at least a partially opened position.

FIG. 4 is a section, with intermediate portions omitted, as seen along the line 4—4 of FIG. 1.

FIG. 5 is a section as seen along the line 5—5 of FIG. 4.

FIG. 6 is a section as seen along the line 6—6 of FIG. 2.

Figure 1:
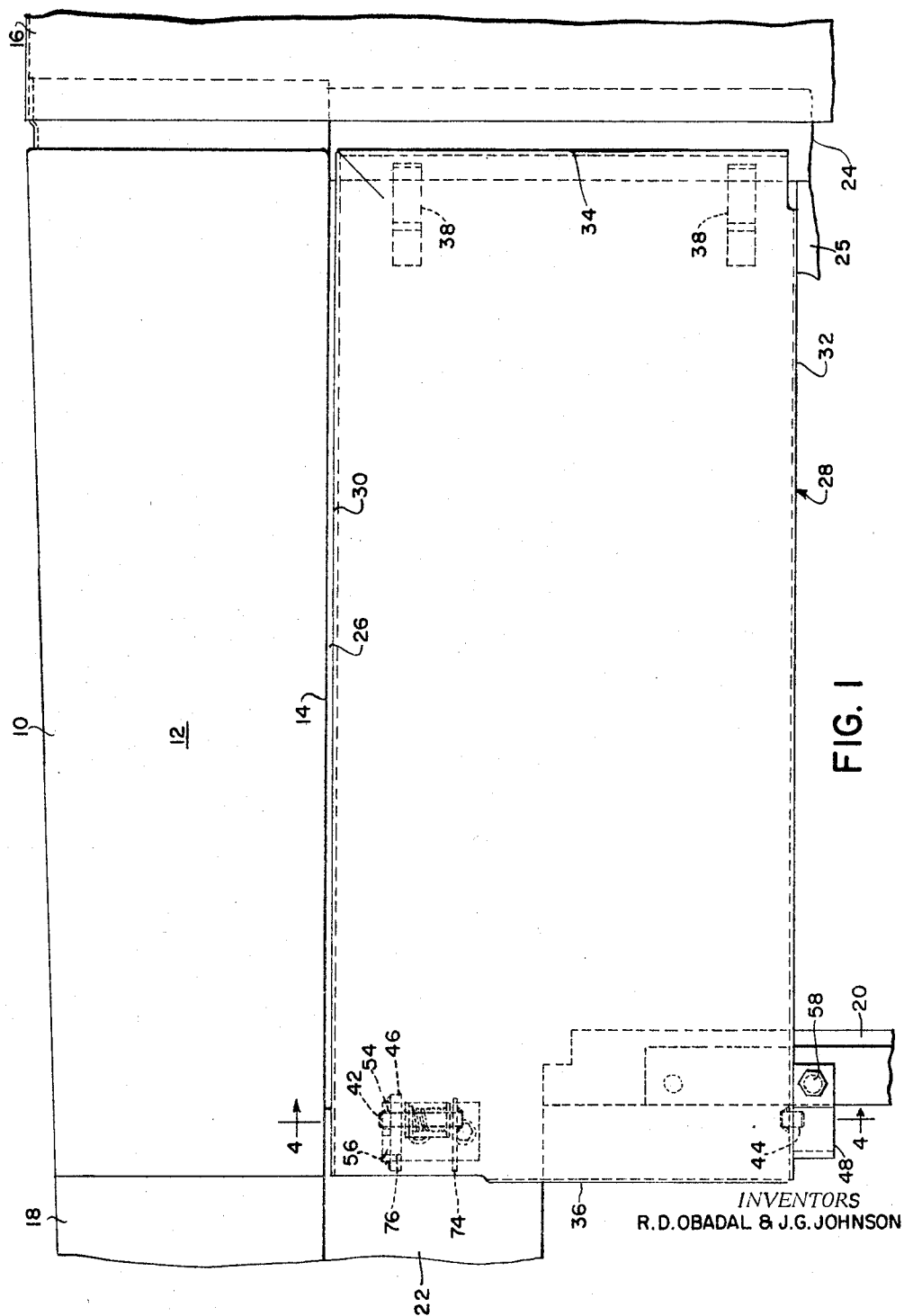
FIG. 1 is a side elevation, with portions broken away, of a typical closure mounting arrangement.

As indicated, the closure finds utility in an environment such as that presented by the engine hood structure of a tractor or the like. However, the arrangement may be used in other instances and accordingly the selected disclosure is not limiting. Moreover, such expressions as "front," "rear," "top" etc. are used as words of convenience, since, obviously, the parts may have other locations than those specifically described.

A typical engine hood structure is illustrated in the drawings, the numeral 10 representing the top hood which extends downwardly at opposite side at 12 (only one side being shown), and each side terminates in a turned-under lower edge 14. In a typical construction, the hood extends fore and aft, effecting a junction at its front end with a radiator shell 16 and having a junction at its rear end with a fixed portion of the vehicle, such as a fuel tank or the like, indicated generally at 18. A portion of the tractor main body is shown at 20 and this, in conjunction with a depending structural portion 22, just below the fuel tank portion 18, establishes what may be regarded as a rear member of the frame structure afforded by the relationship of the several components just described, a vertical member 24 at the rear of the radiator shell 16 affording an upright front member. These portions, together with the lower marginal edge 14 of the hood 10 and a forward frame portion 25, define an opening 26 which, in the absence or removal of a closure element or side sheet 28, would expose the engine (not shown).

The closure element or side sheet 28 is essentially rectangular in construction and when in its closed position as shown in FIGS. 1 and 2 spans the front and rear upright members 24 and 20–22, having a top marginal edge 30 spaced slightly below the lower marginal edge 14 of the hood side 12, a bottom marginal edge 32 and front and rear upright portions 34 and 36, the former lying proximate to the upright front member 24 and the latter lying proximate to the upright rear member 20–22.

When the panel or closure element is in its closed position (FIGS. 1 and 2), it is held in place by front retaining means, here comprising a pair of vertically spaced apart forwardly projecting clips or parts 38, each of which is rigidly affixed in any suitable manner to an inside surface of the forward portion 34 of the panel. Each of these is so arranged that it provides a forwardly opening slot 40 which is adapted to hook behind the rear marginal edge of the front member 24. Thus, the parts 24 and 38 are forwardly engageable when the panel is shifted forwardly and are rearwardly disengageable when the panel is shifted rearwardly. The latter function is incident to movement of the panel to its open position as shown best in FIG. 3.

For the purpose of accomplishing this, the rear end of the panel is equipped with mounting means including a hinge device having upper and lower vertically coaxial upright pins or pintles 42 and 44. These are associated respectively with upper and lower guide parts 46 and 48, respectively. The upper guide is a part of a bracket or support 50 which is secured, as by bolts 52, to the rear frame portion 22. This bracket extends laterally outwardly toward the sheet and is provided with front and rear downwardly opening recesses, here in the form of apertures 54 and 56 (FIG. 6). When the panel is in its front, closed position, the pin 42 is received by the front aperture or recess 54. The lower coaxial pin 44 at this time is received in the lower guide part 48, which is a U-shaped member secured as by a cap screw 58 to the frame portion 20, the member thereby having a fore-and-aft slot 60 in which the pin 44 is fore-and-aft slidably received. The rear end of the slot 60 is closed at 62 to afford a seat when the hinging function occurs. The slot opens forwardly at 64 to allow escape of the pin 44, as will be presently described.

From the description thus far, it will be seen that the panel 28 is carried in its closed position by a combination of the rear hinge devices 42–46 and 44–48 and the front retaining devices 38–24. The forward portion 34 of the panel is notched at 66 so as to closely abut the rear terminal edge of the front frame member 24, and the lower front corner of the panel, when closed, rests on the forward frame portion 25 and prevents downward sagging of the panel when in its closed position; and consequently the lower pin 44 does not slide rearwardly in the slot 60 of the lower guide part 48. Since the clips 38 hook behind the front member 24, outward swinging of the panel, while in its front position, is prevented.

Rigidly affixed to the interior of the rear portion 36 of the panel is a U-shaped mounting member 68, the laterally inwardly extending ears of which are apertured in alinement to mount the upper pin 42. A coil spring 70, acting between the lower ear of the member 68 and a pin 72 through the pin 42, biases the pin upwardly so that it tends to remain in engagement with the front aperture or recess 54. A suitable operating handle 74 is rigidly affixed to the lower end of the pin 42 so that it may be manually withdrawn against the bias of the spring so as to withdraw the pin 42 from the aperture 54. The operator may easily reach in behind and around the rear edge 36 of the panel to obtain access to the handle, it being noted that the panel is spaced outwardly from the support portion 22.

When the pin 42 is retracted from the front aperture 54, the panel may be shifted bodily rearwardly, the retracted pin being guided at its upper end by a fore-and-aft slot means 76 in the upper guide part 46. Opposite ends of the slot 76 are respectively in vertical register with the front and rear apertures 54 and 56. The arrangement is such that the pin 42 is not wholly withdrawn from the carrier parts 46–50. During rearward shifting of the panel 28 to its rear position, the lower pin 44 of course slides rearwardly in the slot 60 until it seats against the rear end 62 thereof, which rear end is in vertical register with the rear end of the slot 76 as well as with the rear aperture 56. The fore-and-aft spacing involved is such that when the panel is in its rear position the clips 38 clear the rear marginal edge of the front frame member 24, thereby releasing the retaining means so that the panel may be swung outwardly at least to the position of FIG. 3. Actually, the panel may be swung outwardly through a range greater than 90°, thus permitting ready access to the engine, for example.

If it is desired to remove the panel completely, the panel, after being swung out to approximately the position of FIG. 3, can be tilted upwardly and rearwardly about a transverse axis through the junction of the upper pin 42 and rear aperture 56, the connection being relatively loose so that such axis is automatically included. Since the top marginal edge 30 is clear of the overhanging in-turned edge 14 of the hood, the panel is sufficiently clear of the hood structure to permit lifting as aforesaid. During this function, the lower pin 44 will slide forwardly and out of the open front end 64 of the slot 60 in the lower guide part 48, easily clearing the cap screw 58. Since the lower portion 32 of the panel is now no longer sustained by the top edges of the guide part 48, the rear portion of the panel is permitted to drop sufficiently to clear the pin 42 from the rear aperture 56 and rear end of the slot 76 in the guide part 46, thus effecting a complete disconnection of the panel 28 from the hood structure.

Replacement of the panel is as simply accomplished, although in reverse order. That is to say, the panel is positioned so that the pin 42, not retracted by the handle 74, is upwardly received by the rear aperture 56, following which the lower pin 44 is guided into the front end 64 of the slot 60 until it seats at the closed rear end 62, at which time the upper and lower pins 42 and 44 effects a hinge at the rear portion of the panel. The panel may now be swung inwardly so that the slots 40 afforded by the clips 38 are in fore-and-aft alinement with the rear marginal edge of the front frame member 24. The pin 42 is now withdrawn by means of the handle 74 and the panel is shifted forwardly. Since the pin 42 is guided by the slot 76, the operator may release pressure on the handle so that when the forward position of the panel is achieved, with the clips 38 hooking in behind the front frame member 24, the pin will snap into the front aperture 54.

The mounting arrangement is simply constructed and readily accomplishes the mounting of the panel for the several positions that it may occupy; viz., closed, open and removed. The operational characteristics are such that the parts are readily controlled and one man can easily handle the panel.

The latch is concealed behind the panel and therefore cannot be inadvertently released by branches of trees, as when the vehicle is used in forestry operations.

Features and advantages other than those enumerated will readily occur to those versed in the art, as will many modifications and alterations in the preferred construction illustrated, all of which may be achieved without departure from the spirit and scope of the invention.

What is claimed is:

In combination, frame structure having spaced apart upright front and rear members; a closure element spanning the members in a closed position and having front and rear portions respectively proximate to said members; means mounting the element for shifting between front and rear positions while closed, for outward swinging to an open position and for separation from the structure, comprising a retaining device forwardly engageable between the element front portion and the front member to sustain the element and to prevent outward displacement thereof in its front position and rearwardly disengageable upon movement of the element to its rear position, a lower part carried by the frame structure adjacent to the rear member and including an upwardly facing fore-and-aft guide, an upper part on the frame structure adjacent said rear member and having front and rear spaced apart downwardly facing recesses spaced apart according to the front and rear positions of the element, an upwardly biased, downwardly retractable upper pin carried by the element rear portion for upward engagement with the front recess when the element is in its front position and for downward retraction from said front recess and for upward engagement with the rear recess upon shifting of the element to its rear position, fore-and-aft slot means on the frame structure closely underlying the upper part and generally coextensive with the spacing of said recesses and receiving and guiding the retracted upper pin during shifting of the element, a lower pin coaxial with the upper pin and downwardly receivable in and fore-and-aft slidably sustained by the lower part, said lower part having a rear end portion vertically coaxial with the rear recess and in which the lower pin seats in the rear position of the element, said end portion, said recess and said pins providing a hinge about which the element is swingable towards its open position following shifting thereof to its rear position to disengage the retaining means, said lower pin being retained in seated relation to said end portion by the weight of the element as said element is swung toward its open position, said lower part having an open forward end enabling forward escape of the lower pin upon upward and forward rocking of the opened element to clear said lower part and to enable downward separation of the upper pin from the upper part and from said slot means so that the element is removable from the structure; and means for selectively retracting the upper pin from either recess.

References Cited by the Examiner

UNITED STATES PATENTS

| | | | |
|---|---|---|---|
| 2,174,781 | 10/1939 | Edwards | 16—176 X |
| 3,059,271 | 10/1962 | Erickson | 20—16 X |
| 3,166,367 | 1/1965 | Vincens | 16—176 X |

HARRISON R. MOSELEY, *Primary Examiner.*

KENNETH DOWNEY, *Examiner.*